United States Patent
Sung et al.

(10) Patent No.: US 8,780,313 B2
(45) Date of Patent: Jul. 15, 2014

(54) LIQUID CRYSTAL DISPLAY DEVICE AND METHOD FOR MANUFACTURING THEREOF

(75) Inventors: Woo Yong Sung, Seoul (KR); Tae Woon Cha, Seoul (KR); Jeong Ho Lee, Seoul (KR); Hyoung Wook Lee, Seoul (KR)

(73) Assignee: Samsung Display Co., Ltd. (KR)

( * ) Notice: Subject to any disclaimer, the term of this patent is extended or adjusted under 35 U.S.C. 154(b) by 176 days.

(21) Appl. No.: 13/399,909

(22) Filed: Feb. 17, 2012

(65) Prior Publication Data
US 2012/0236236 A1 Sep. 20, 2012

(30) Foreign Application Priority Data
Mar. 14, 2011 (KR) .................. 10-2011-0022387

(51) Int. Cl.
*G02F 1/1339* (2006.01)

(52) U.S. Cl.
USPC ........................................ 349/155; 349/156

(58) Field of Classification Search
USPC ................................................. 349/155–156
See application file for complete search history.

(56) References Cited

U.S. PATENT DOCUMENTS

| | | | | |
|---|---|---|---|---|
| 5,334,424 A | * | 8/1994 | Hani et al. | 428/1.6 |
| 5,556,670 A | * | 9/1996 | Mihara et al. | 428/1.5 |
| 7,492,435 B2 | * | 2/2009 | Jeon | 349/155 |
| 7,812,915 B2 | * | 10/2010 | Kim et al. | 349/155 |
| 8,040,484 B2 | | 10/2011 | Kim | |
| 2008/0204645 A1 | * | 8/2008 | Kawabe et al. | 349/123 |

FOREIGN PATENT DOCUMENTS

JP 2007-033797 A 2/2007

* cited by examiner

*Primary Examiner* — Phu Vu
(74) *Attorney, Agent, or Firm* — Innovation Counsel LLP

(57) ABSTRACT

The present invention relates to a liquid crystal display that maintains a more uniform cell gap and improves adherence between two display panels by improving adhesion between substrates and their bead spacers, as well as a manufacturing method thereof. An exemplary liquid crystal display includes: a first substrate and a second substrate facing each other; a bead spacer comprising a plurality of beads and a first adhesive coupling the beads to the first substrate; a second adhesive corresponding to the bead spacer and disposed on the second substrate so as to contact the bead spacer; and a liquid crystal layer disposed between the first substrate and the second substrate.

11 Claims, 7 Drawing Sheets

LIQUID CRYSTAL DISPLAY DEVICE AND METHOD FOR MANUFACTURING THEREOF

CROSS-REFERENCE TO RELATED APPLICATION

This application claims priority to, and the benefit of, Korean Patent Application No. 10-2011-0022387 filed in the Korean Intellectual Property Office on Mar. 14, 2011, the entire contents of which are incorporated herein by reference.

BACKGROUND OF THE INVENTION (a) Field of the Invention

The present invention relates to a liquid crystal display and a manufacturing method thereof. More particularly, the present invention relates to a liquid crystal display that more uniformly maintains a cell gap and improves adherence between two display panels, as well as manufacturing methods thereof.

(b) Description of the Related Art

A liquid crystal display (hereinafter referred to as an LCD) is one of the most widely used types of flat panel displays. An LCD typically includes two display panels provided with electric field generating electrodes, such as pixel electrodes and a common electrode, and a liquid crystal layer interposed between the two display panels. In the LCD, voltages are applied to the electric field generating electrodes to generate an electric field in the liquid crystal layer. Due to the generated electric field, liquid crystal molecules of the liquid crystal layer are aligned, which controls polarization of incident light, thereby displaying images.

In a liquid crystal display, an upper panel and a lower panel are typically combined by a sealant, which is disposed on an edge circumference of the upper panel and the lower panel and which encloses the liquid crystal layer. Also, an interval between two display panels, that is, a cell gap, may be relatively uniformly maintained by a spacer disposed between the upper panel and the lower panel.

Here, the spacer may be classified as bead spacers or column spacers. In general, the bead spacer has a spherical shape and is irregularly dispersed on a substrate, and the column spacer is formed to have a predetermined pattern through a photolithography process.

The bead spacer may be formed without a photolithography process, such that the manufacturing process is simple compared to the column spacer and its manufacturing cost is low. However, its adhesion with substrates is relatively weak, such that it is more difficult to maintain a uniform cell gap when an external force is applied to the liquid crystal display.

A recent trend has seen efforts directed toward development of a flexible display device that may be flexibly bent and rolled. When the flexible display device is manufactured using bead spacers and the substrate is bent, the cell gap is not uniformly maintained, such that a luminance difference in a region is generated. Also, such bending may move the bead spacer, such that an alignment layer disposed on the substrate may be damaged.

Further, when combining the upper panel and the lower panel by only the sealant formed at the edge circumference of the substrate, there is no member fixing the two display panels at the center of the substrate, resulting in a weak bond between the substrates.

The above information disclosed in this Background section is only for enhancement of understanding of the background of the invention and therefore it may contain information that does not form the prior art that.

SUMMARY OF THE INVENTION

The present invention provides a liquid crystal display that more uniformly maintains a cell gap even when a substrate is bent, by improving adhesion between a bead spacer and the substrate. Also provided is a manufacturing method thereof.

Also described is a liquid crystal display improving adherence between two display panels by using the bead spacer to fix two display panels, and a manufacturing method thereof.

A liquid crystal display according to the present invention includes: a first substrate and a second substrate facing each other; a bead spacer comprising a plurality of beads and a first adhesive coupling the beads to the first substrate; a second adhesive corresponding to the bead spacer and disposed on the second substrate so as to contact the bead spacer; and a liquid crystal layer disposed between the first substrate and the second substrate.

The first adhesive and the second adhesive may be made of the same material.

The first adhesive and the second adhesive may be a thermosetting adhesive.

The first adhesive and the second adhesive may be made of a material that does not react with the liquid crystal layer.

The first adhesive and the second adhesive may be made of a material including an epoxy group with a content of metal ions of less than about 10 ppb.

The first substrate and the second substrate may be flexible substrates.

The liquid crystal display may further comprise color filters and a light blocking member positioned between the color filters, where the bead spacer is positioned on the light blocking member.

A method for manufacturing a liquid crystal display according to the present invention includes: (a) forming a bead spacer on the first substrate, the bead spacer comprising a plurality of beads mixed with a first adhesive; (b) forming a second adhesive on the second substrate at a position corresponding to the bead spacer; (c) forming a liquid crystal layer between the first substrate and the second substrate, and combining the first substrate and the second substrate; and (d) hardening the bead spacer and the second adhesive.

In (a) and (b), the bead spacer and the second adhesive may each be formed by a printing method.

The first adhesive and the second adhesive may be made of the same material.

The first adhesive and the second adhesive may be a thermosetting adhesive.

The first adhesive and the second adhesive are made of a material that may not react with the liquid crystal layer.

The first adhesive and the second adhesive may be made of a material including an epoxy group with an amount of metal ions of less than about 10 ppb.

The first substrate and the second substrate may be flexible substrates.

In the above, (a) may further comprise forming the bead spacer on a light blocking member formed on the first substrate.

The liquid crystal display according to the present invention may more uniformly maintain its liquid crystal cell gap even if the substrate is bent. This is accomplished by improving the adhesion between the substrate and the bead spacer. This improved adhesion may help to prevent damage to the alignment layer.

The bead spacer is used to fix two display panels such that adherence between the two display panels may be improved.

The spacer is formed without a photolithography process, such that the manufacturing process may be simplified and a developing solution is not used. This results in a more environmentally friendly fabrication process.

The bead spacer is formed by a printing method, such that the bead spacer may be formed at a regular and desired position. In detail, the bead spacer is positioned to correspond to a respective light blocking member, so that light leakage may be reduced and aperture ratio may be increased.

Also, the bead spacer has improved compression characteristics such that the drip margin of the liquid crystal may be improved.

DETAILED DESCRIPTION OF THE EMBODIMENTS

Figure 1:
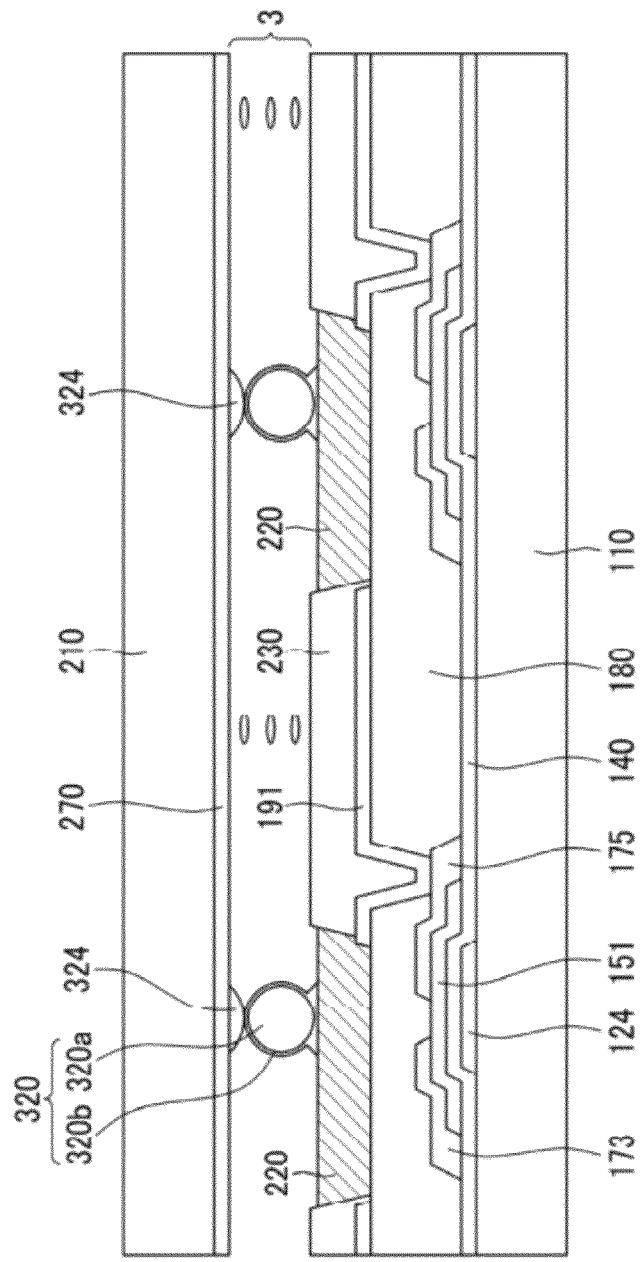
FIG. 1 is a cross-sectional view of a liquid crystal display according to an exemplary embodiment of the present invention.

The present invention will be described more fully hereinafter with reference to the accompanying drawings, in which exemplary embodiments of the invention are shown. As those skilled in the art will realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Firstly, a liquid crystal display according to an exemplary embodiment of the present invention will be described with reference to accompanying drawings.

Figure 2:
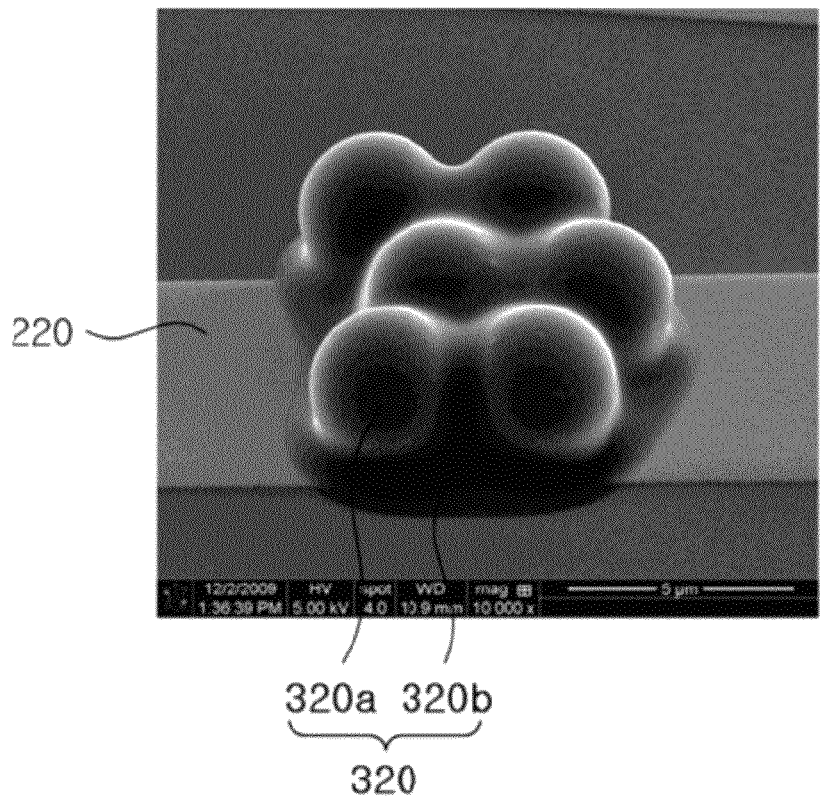
FIG. 2 is a view showing a bead spacer formed on the first substrate of a liquid crystal display according to an exemplary embodiment of the present invention.
Figure 3:
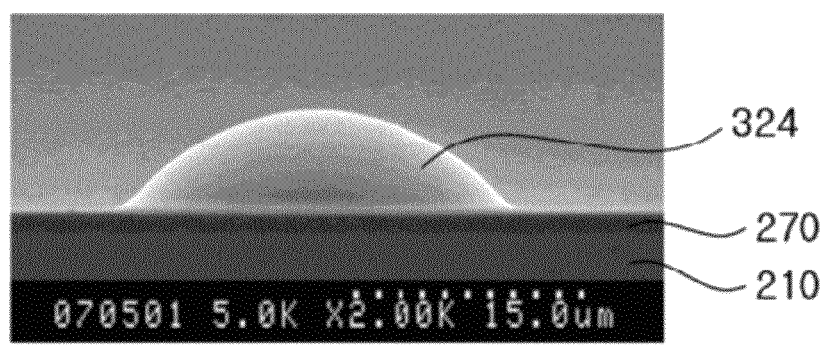
FIG. 3 is a view showing the second adhesive formed on the second substrate of a liquid crystal display according to an exemplary embodiment of the present invention.

FIG. 1 is a cross-sectional view of a liquid crystal display according to an exemplary embodiment of the present invention. FIG. 2 is a view showing a bead spacer disposed on the first substrate of a liquid crystal display according to an exemplary embodiment of the present invention, and FIG. 3 is a view showing the second adhesive disposed on the second substrate of a liquid crystal display according to an exemplary embodiment of the present invention.

A liquid crystal display according to an exemplary embodiment of the present invention includes a first substrate 110 and a second substrate 210 facing each other, a bead spacer 320 disposed on the first substrate 110, a second adhesive 324 disposed on the second substrate 210, and a liquid crystal layer 3 disposed between the first substrate 110 and the second substrate 210.

The first substrate 110 and the second substrate 210 may each be made of a flexible material such as a plastic. When the first substrate 110 and the second substrate 210 are made of the flexible material, they may be used in a flexible display device that may be bent or rolled. That is, "flexible" substrates 110, 210 are sufficiently flexible to allow the resulting display device to be bent or rolled.

A thin film transistor and a pixel electrode 191 connected thereto are disposed on the first substrate 110. The thin film transistor includes a gate electrode 124 disposed on the first substrate 110, a gate insulating layer 140 disposed on the gate electrode 124, a semiconductor layer 151 disposed on the gate insulating layer 140, a source electrode 173 and a drain electrode 175 separated from each other on the semiconductor layer 151, and a passivation layer 180 disposed on both the source electrode 173 and the drain electrode 175 and including a contact hole exposing a portion of the drain electrode 175. The pixel electrode 191 is connected to the drain electrode 175 through the contact hole.

A color filter 230 is disposed on the pixel electrode 191, and a light blocking member 220 is disposed between adjacent color filters 230. The light blocking member 220 is disposed to at least approximately correspond to the thin film transistor.

A common electrode 270 is disposed on substantially the entire surface of the second substrate 210.

As shown in FIG. 2, the bead spacer 320 includes beads 320a and a first adhesive 320b that are mixed and formed on the first substrate 110. The first adhesive 320b substantially encloses the beads 320a (or at least encompasses an area between the beads 320a and the corresponding underlying surface), thereby adhering the beads 320a to the first substrate 110.

The bead spacer 320 may be disposed on the light blocking member 220 in a single layer, i.e. not stacked upon one another, and/or all at substantially the same elevation. The bead spacer 320 is disposed to correspond to the light blocking member 220 such that light leakage may be reduced and an aperture ratio may be increased as compared to the case of bead spacers 320 that are disposed in the pixel area.

As shown in FIG. 3, the second adhesive 324 is disposed on the common electrode 270 of the second substrate 210. The second adhesive 324 is disposed to correspond to the bead spacer 320, such that the bead spacer 320 is adhered to the second substrate 210.

The first adhesive 320b and the second adhesive 324 may be made of the same material. For example, they may be made of a thermosetting adhesive or a UV hard setting adhesive. It is preferable that the second adhesive 324 is made of a thermosetting adhesive when the first adhesive 320b is made of a thermosetting adhesive, and that the second adhesive 324 is made of a UV hard setting adhesive when the first adhesive 320b is made of a UV hard setting adhesive. In the case that the first adhesive 320b is a thermosetting adhesive and the second adhesive 324 is made of a UV hard setting adhesive, when heat is applied to adhere the bead spacer 320 to the second substrate 210, only the first adhesive 320b is reacted, such that adhesion does not progress normally. In contrast, when UV is irradiated, only the second adhesive 324 is reacted such that adhesion also does not progress normally. Accordingly, the first adhesive 320b and the second adhesive 324 may preferably be made of the same material.

The first adhesive 320b and the second adhesive 324 are preferably formed of a thermosetting adhesive rather than a UV hard setting adhesive. When the bead spacer 320 is disposed to correspond to the light blocking member 220, if the first adhesive 320b is made of a UV hard setting adhesive, when UV light is irradiated upon the first substrate 110, the UV is blocked by the light blocking member 220 such that UV light does not reach the first adhesive 320b and adhesion does not progress in normal fashion, i.e. the adhesive does not adequately set. In contrast, if the first adhesive 230b is made of a thermosetting adhesive, when heat is applied outside the first substrate 110, the heat is not influenced by the light blocking member 220 and is transmitted to the first adhesive 320b such that the adhesive sets and adhesion progresses well.

The first adhesive 320b and the second adhesive 324 may be made of a material that does not react with the liquid crystal layer 3. The first adhesive 320b and the second adhesive 324 are disposed between the first substrate 110 and the second substrate 210 along with the liquid crystal layer 3 such that the first adhesive 320b and the second adhesive 324 may contact the liquid crystal layer 3. Thus, if the first adhesive 320b and the second adhesive 324 are made of a material that reacts with the liquid crystal layer 3, the characteristics of the liquid crystal layer 3 may be altered for the worse.

Both the first adhesive 320b and the second adhesive 324 preferably do not include metal ions, so as not to react with the liquid crystal layer 3. For example, the first adhesive 320b and the second adhesive 324 may be made of a material of an epoxy group having an amount of metal ions of less than about 10 ppb (parts per billion).

Next, a manufacturing method of a liquid crystal display according to an exemplary embodiment of the present invention will be described with reference to the accompanying drawings.

Figure 4:
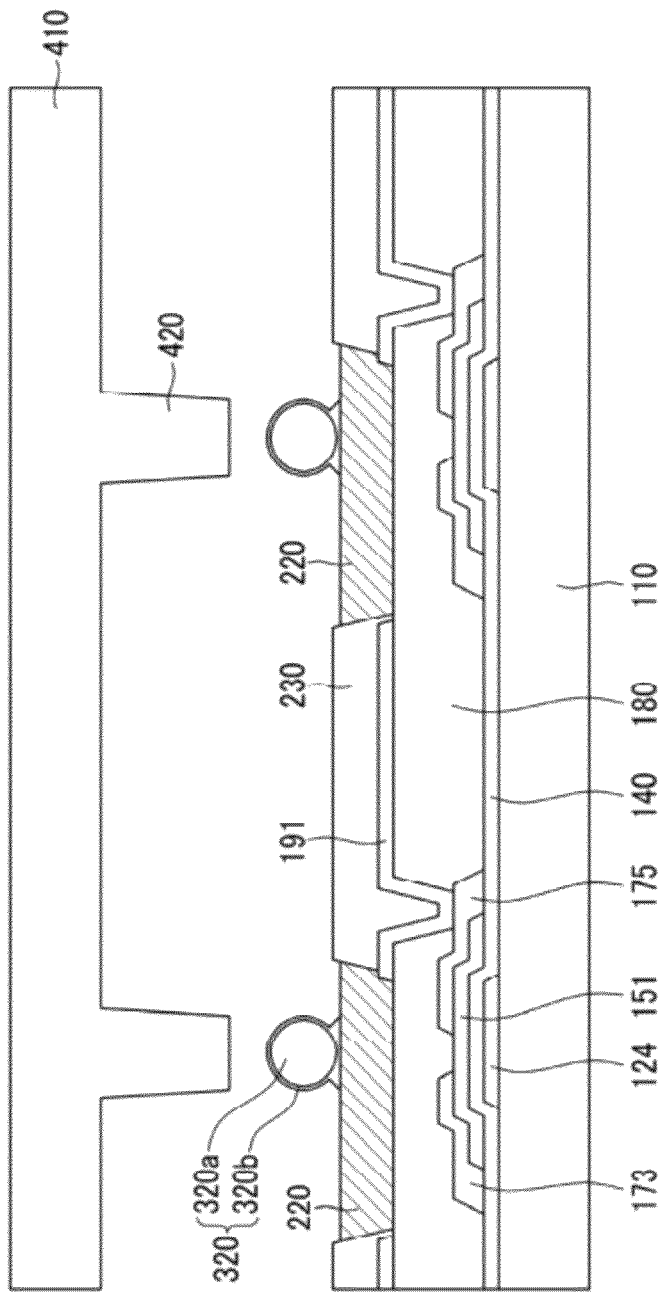
FIG. 4 to FIG. 6 are cross-sectional views showing a manufacturing method of a liquid crystal display according to an exemplary embodiment of the present invention.
Figure 5:
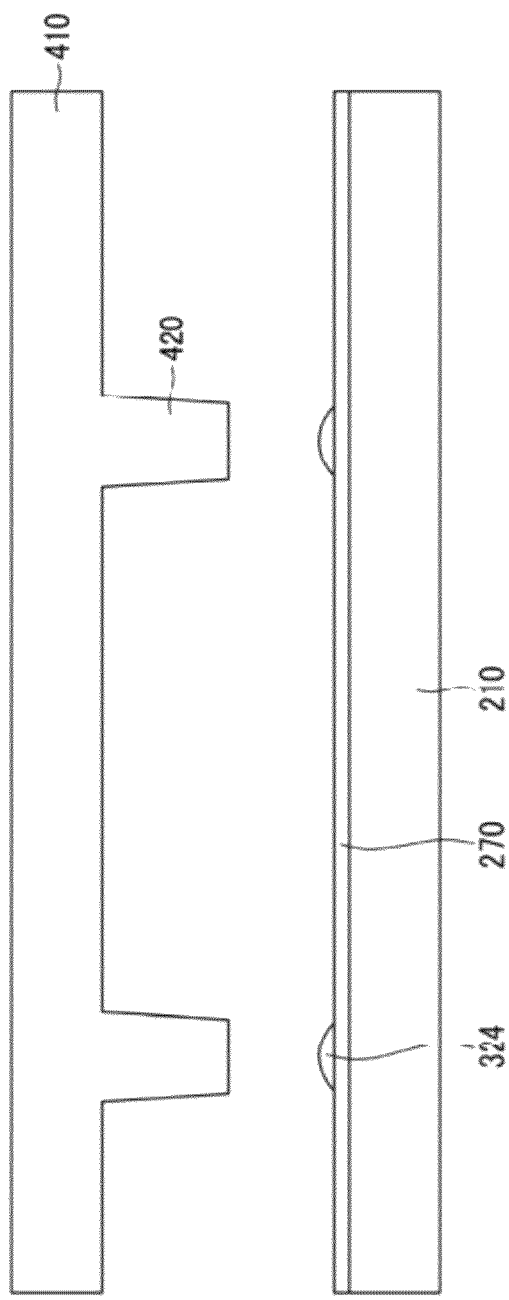
Figure 6:
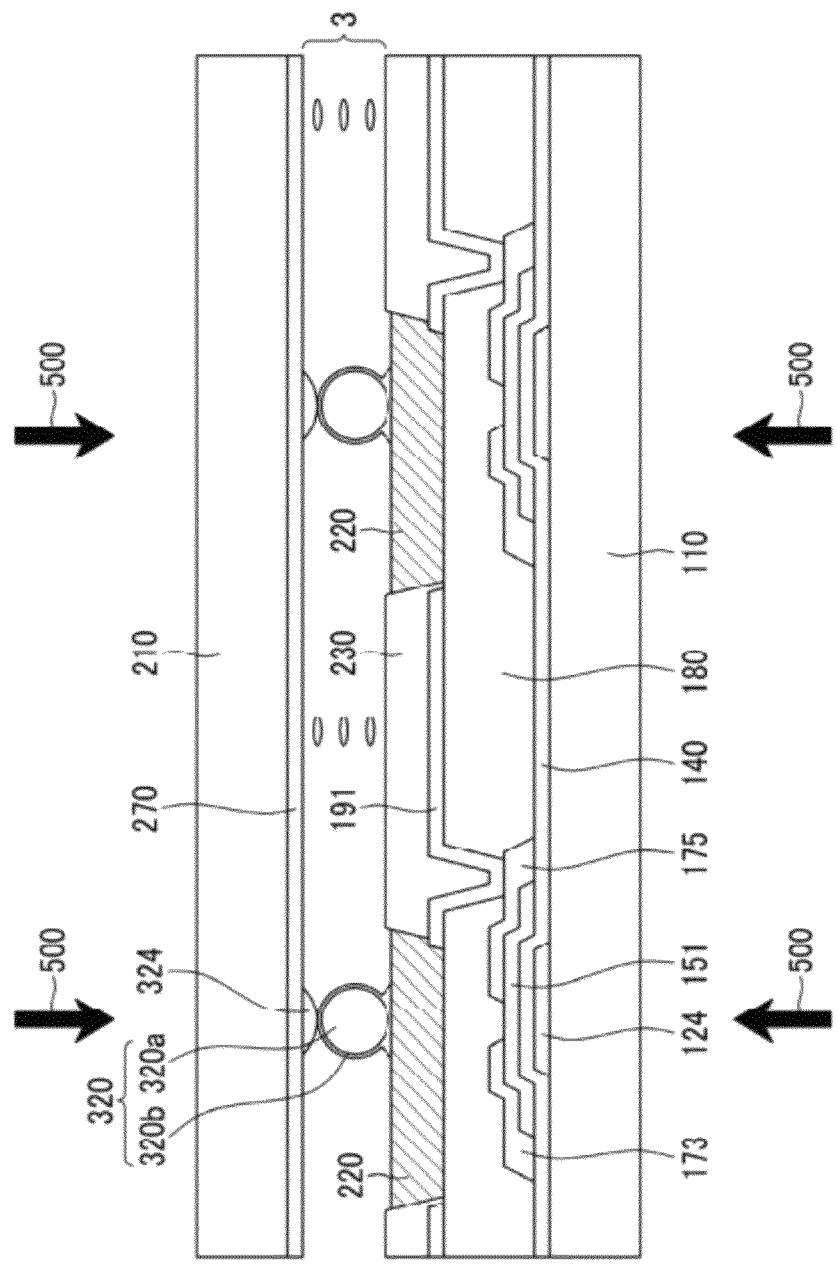

FIG. 4 to FIG. 6 are cross-sectional views showing a manufacturing method of a liquid crystal display according to an exemplary embodiment of the present invention.

First, as shown in FIG. 4, an inkjet head 410 is aligned over the first substrate 110 of the flexible material, and a material of which the beads 320a and the first adhesive 320b are to be made of is dripped onto the first substrate 110 through a nozzle 420 connected to the inkjet head 410, thus forming bead spacers 320.

A plurality of nozzles 420 may be formed at the lower surface of the inkjet head 410. Also, the inkjet head 410 is connected to a transferring unit (not shown) to be moved such that the material of which the bead 320a and the first adhesive 320b are made may be deposited in multiple regions of the first substrate 110.

A thin film transistor and a pixel electrode 191 connected thereto are formed on the first substrate 110. The thin film transistor includes a gate electrode 124 formed on the first substrate 110, a gate insulating layer 140 formed on the gate electrode 124, a semiconductor layer 151 formed on the gate insulating layer 140, a source electrode 173 and a drain electrode 175 separated from each other formed on the semiconductor layer 151, and a passivation layer 180 formed on both the source electrode 173 and the drain electrode 175 and including a contact hole exposing a portion of the drain electrode 175. The pixel electrode 191 is connected to the drain electrode 175 through the contact hole.

A color filter 230 is formed on the pixel electrode 191, and a light blocking member 220 is formed between adjacent color filters 230. The light blocking member 220 is disposed to correspond to (e.g., at least partially cover) the thin film transistor.

The material of which the bead 320a and the first adhesive 320b are mixed may be dripped to be disposed on the light blocking member 220. By disposing the bead spacer 320 to correspond to the light blocking member 220, light leakage may be reduced and the aperture ratio may be increased compared with the case in which the bead spacers 320 are disposed in the pixel area.

Next, as shown in FIG. 5, the inkjet head 410 is aligned on the flexible second substrate 210, and the second adhesive 324 is dripped on the second substrate 210 through the nozzle 420 connected to the inkjet head 410.

A common electrode 270 is formed on substantially the entire surface of the second substrate 210, and the second adhesive 324 is formed on the common electrode 270 of the second substrate 210. The second adhesive 324 is disposed at a position allowing contact with the bead spacer 320 when combined with the first substrate 110 in a subsequent process.

Here, the second adhesive 324 is dripped in a plurality of regions on the second substrate 210 through a plurality of nozzles 420 while moving the inkjet head 410.

The first adhesive 320b and the second adhesive 324 may be made of the same material. For example, they may be made of a thermosetting adhesive or a UV hard setting adhesive. As described above, the first adhesive 320b and the second adhesive 324 are preferably formed of the thermosetting adhesive rather than the UV hard setting adhesive.

The first adhesive 320b and the second adhesive 324 may be made of a material that does not react with the liquid crystal layer (i.e., layer 3 of FIG. 3). In detail, the first adhesive 320b and the second adhesive 324 may be made of a material from an epoxy group having an amount of metal ions less than about 10 ppb (parts per billion).

Next, as shown in FIG. 6, a liquid crystal layer 3 is formed between the first substrate 110 and the second substrate 210, and the first substrate 110 and the second substrate 210 are combined. For example, after the liquid crystal material is dripped onto the first substrate 110 or the second substrate 210, the first substrate 110 and the second substrate 210 may be combined. Alternatively, after the first substrate 110 and the second substrate 210 are combined, the liquid crystal material may be injected between the first substrate 110 and the second substrate 210.

When the first adhesive 320b and the second adhesive 324 are made of the thermosetting adhesive, heat 500 is then applied outside the first substrate 110 and the second substrate 210 to harden the bead spacer 320 and the second adhesive 324.

The bead spacer 320 is fixed to the first substrate 110 by the first adhesive 320b, which has been formed to enclose the beads 320a. The bead spacer 320 is also fixed to the second substrate 210 by the second adhesive 324, which has been formed at a position corresponding to the bead spacer 320.

That is, the bead spacer 320 is attached to both the first substrate 110 and the second substrate 210, so that it is fixed in place. Accordingly, even if the first substrate 110 and the second substrate 210 are bent, the cell gap may be maintained substantially uniform, thus improving the adherence characteristics of the first substrate 110 and the second substrate 210.

The bead spacer 320 and the second adhesive 324 are formed by a particular printing method, being dripped onto the first substrate 110 and the second substrate 210 through the nozzle 420 connected to the inkjet head 410. However, the present invention is not limited thereto, and the bead spacer 320 and the second adhesive 324 may be formed on the first substrate 110 and the second substrate 210 by using various other methods.

Nanoimprint lithography, gravure printing, reverse offset printing, offset printing, and microcontact printing are examples of various possible printing methods.

Nanoimprint lithography is a technique for forming a minute pattern through a precise mold of a nanoscan. In this method, a thermoplastic resin or photo-curable resin is coated on the substrate, and then pressure is applied, similar to stamping a seal, to transcribe the pattern. Gravure printing is a printing method using a printing gravure formed by corroding the surface of a substrate to include an ink pocket made of an anticorrosion film in the substrate by using a gravure screen and a carbon tissue for printing. In offset printing, an ink image is transferred from a printing plate to a rubber blanket, and is then printed. Microcontact printing is a method of forming a pattern by using an elastic polymer stamp.

In the above-described exemplary embodiment of the present invention, a color filter on array (COA) structure was employed in which the thin film transistor, the pixel electrode 191, the color filter 230, and the light blocking member 220 are formed on the first substrate 110, and the common electrode 270 is formed on the second substrate 210. However, the present invention is not limited thereto, and various alternative structures may instead be employed, such as a structure in which the color filter 230 and the light blocking member 220 are formed on the second substrate 210 and a structure in which the common electrode 270 is formed on the first substrate 110.

Next, an effect in which a drip margin is improved in a liquid crystal display will be described.

Figure 7:
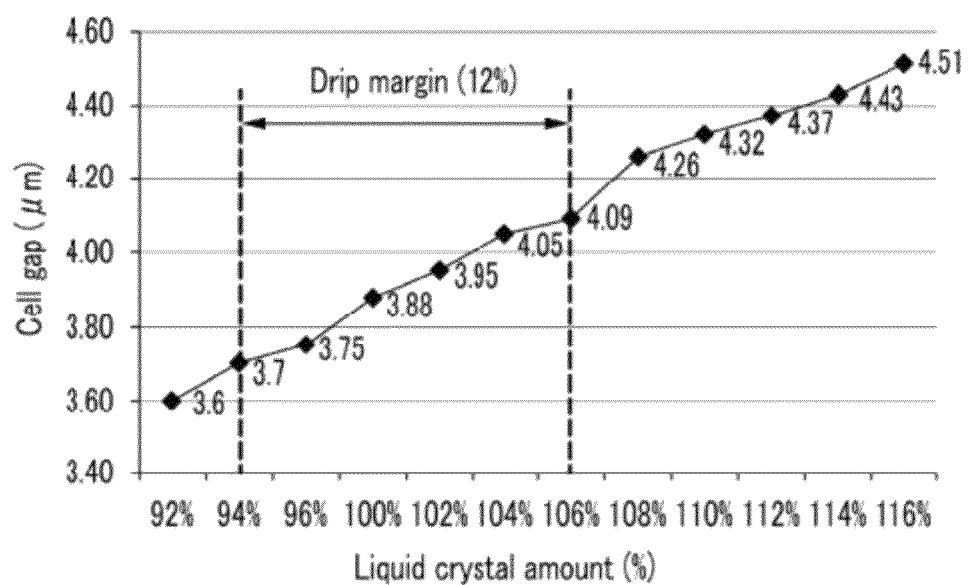
FIG. 7 and FIG. 8 are graphs showing a change of a cell gap according a liquid crystal amount in a liquid crystal display of the present invention.
Figure 8:
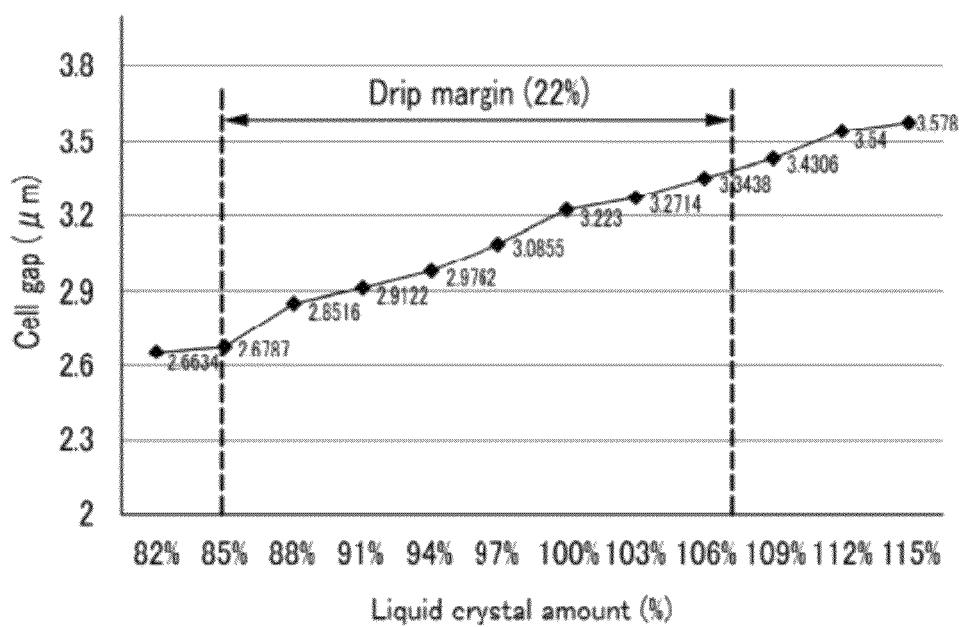

FIG. 7 and FIG. 8 are graphs showing a change in cell gap as a function of a liquid crystal amount, in a liquid crystal display constructed according to an embodiment of the present invention.

In the graphs, each horizontal axis represents a liquid crystal amount that is 100% when the liquid crystal completely fills the volume corresponding to a space between two substrates. A number less than 100% corresponds to a situation in which the liquid crystal does not sufficiently fill the space between the two substrates, and a number greater than 100% corresponds to a situation in which liquid crystal overfills the space between the two substrates.

In the graphs, each vertical axis represents an interval between the two substrates, that is, the cell gap.

Referring to FIG. 7, as the liquid crystal amount is increased, the cell gap is increased. When the liquid crystal amount is insufficiently filled at less than 100% or is excessively at filled more than 100%, deterioration may be generated. Here, it has been found that the range of the liquid crystal amount in which deterioration is not generated is about more than 94% and less than 106%. Accordingly, the drip margin of the liquid crystal is about 12%.

In contrast, when the bead spacer is not used but the column spacer is used in the liquid crystal display of the same condition, the corresponding range of liquid crystal amount to avoid image deterioration is about more than 100% and less than 106%. Accordingly, the drip margin of the liquid crystal is about 6%.

In FIG. 8, the range of the liquid crystal amount that avoids image deterioration due to insufficient or excessive filling of the liquid crystal is about more than 85% and less than 107%. Accordingly, the drip margin of the liquid crystal is about 22%.

In contrast, when the bead spacer is not used but the column spacer is used in the liquid crystal display of the same condition, the corresponding range of liquid crystal amount to avoid image deterioration is about more than 100% and less than 107%. Accordingly, the drip margin of the liquid crystal is about 7%.

From the above, it can be seen that use of bead spacers instead of column spacers increases the drip margin of the liquid crystal from about 6% to 7% to about 12% to 22%. This is believed due to the fact that the bead spacer is made of a material having elasticity, which results in improved compression characteristics for the resulting display.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description Of Symbols>

| 3: liquid crystal layer | 110: the first substrate |
|---|---|
| 124: gate electrode | 140: gate insulating layer |
| 151: semiconductor layer | 173: source electrode |
| 175: drain electrode | 180: passivation layer |
| 191: pixel electrode | 210: the second substrate |
| 220: light blocking member | 230: color filter |
| 270: common electrode | 320: bead spacer |
| 320a: beads | 320b: first adhesive |
| 324: second adhesive | |

What is claimed is:

1. A liquid crystal display comprising:
a first substrate and a second substrate facing each other;
a bead spacer comprising a plurality of beads and a first adhesive coupling the beads to each other and to the first substrate;
a second adhesive corresponding to the bead spacer and disposed on the second substrate so as to contact the bead spacer; and
a liquid crystal layer disposed between the first substrate and the second substrate;
wherein the first adhesive and the second adhesive are made of material that does not react with the liquid crystal layer, the material including an epoxy group with a content of metal ions of less than about 10ppb.

2. The liquid crystal display of claim 1, wherein the first adhesive and the second adhesive are made of the same material.

3. The liquid crystal display of claim 2, wherein the first adhesive and the second adhesive are a thermosetting adhesive.

4. The liquid crystal display of claim 1, wherein the first substrate and the second substrate are flexible substrates.

5. The liquid crystal display of claim 1, further comprising color filters and a light blocking member positioned between the color filters, wherein the bead spacer is positioned on the light blocking member.

6. A method of manufacturing a liquid crystal display comprising:
(a) forming a bead spacer on the first substrate, the bead spacer comprising a plurality of beads mixed with, and coupled to each other by, a first adhesive;
(b) forming a second adhesive on the second substrate at a position corresponding to the bead spacer, wherein the first adhesive and the second adhesive are made of material that does not react with the liquid crystal laver, the material including an epoxy group with a content of metal ions of less than about 10ppb;

(c) forming a liquid crystal layer between the first substrate and the second substrate, and combining the first substrate and the second substrate; and (d) hardening the bead spacer and the second adhesive.

7. The method of claim 6, wherein in (a) and (b), the bead spacer and the second adhesive are each formed by a printing method.

8. The method of claim 6, wherein the first adhesive and the second adhesive are made of the same material.

9. The method of claim 8, wherein the first adhesive and the second adhesive are a thermosetting adhesive.

10. The method of claim 6, wherein the first substrate and the second substrate are flexible substrates.

11. The method of claim 6, wherein (a) further comprises forming the bead spacer on a light blocking member formed on the first substrate.

* * * * *